(12) United States Patent
Misu

(10) Patent No.: US 10,846,028 B2
(45) Date of Patent: Nov. 24, 2020

(54) IMAGE FORMING APPARATUS

(71) Applicant: KYOCERA Document Solutions Inc., Osaka (JP)

(72) Inventor: Kazuto Misu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/673,009

(22) Filed: Nov. 4, 2019

(65) Prior Publication Data

US 2020/0150908 A1    May 14, 2020

(30) Foreign Application Priority Data

Nov. 8, 2018 (JP) ................................ 2018-210737

(51) Int. Cl.
*G06F 15/00* (2006.01)
*G06F 3/12* (2006.01)
(52) U.S. Cl.
CPC .......... *G06F 3/1208* (2013.01); *G06F 3/1242* (2013.01); *G06F 3/1255* (2013.01)
(58) Field of Classification Search
CPC ..... G06F 3/1208; G06F 3/1242; G06F 3/1255

USPC ........................................................ 358/1.15
See application file for complete search history.

(56) References Cited

U.S. PATENT DOCUMENTS

| | | | |
|---|---|---|---|
| 8,693,044 B2 * | 4/2014 | Hayakawa | H04N 1/3875 358/1.15 |
| 2009/0079128 A1 * | 3/2009 | Enomoto | H04N 1/00567 271/256 |
| 2018/0129457 A1 * | 5/2018 | Akiyama | G06F 3/1219 |
| 2018/0299814 A1 * | 10/2018 | Matsuo | G03G 15/5062 |

FOREIGN PATENT DOCUMENTS

JP     H0557964 A    3/1993

* cited by examiner

*Primary Examiner* — Mark R Milia
(74) *Attorney, Agent, or Firm* — Studebaker & Brackett PC

(57) ABSTRACT

An image forming apparatus comprises an image processing part, an image forming part, and an inquiry output part. The image processing part performs image processing on image data. The image forming part forms an image on a sheet based on the image data. The inquiry output part outputs, when a page indicated by the image data includes an image at only an upstream side end part in a scanning direction and a consumption of a toner used on the page is less than a predetermined threshold, an inquiry about whether or not a print processing of the page is performed.

9 Claims, 3 Drawing Sheets

IMAGE FORMING APPARATUS

INCORPORATION BY REFERENCE

This application is based on and claims the benefit of priority from Japanese Patent application No. 2018-210737 filed on Nov. 8, 2018, the entire contents of which are incorporated herein by reference.

BACKGROUND

The present disclosure relates to an image forming apparatus.

For example, a print apparatus (an image forming apparatus) inputs coded data of characters or images from external and expands the data to print on a predetermined sheet. The print apparatus includes a display device which displays correlation between a printing range of the input data and size of the sheet, and includes a warning generation device which generates a warning when the printing range of the input data exceeds the size of the sheet.

The image forming apparatus is configured so as to form an image on a sheet based on an input image data. However, the printing range of a page set to the image data sometimes exceeds the size of the sheet, in such case, the image is divided against intention of a user. For example, when image data of a table is printed, in a case where a right end part of the table is a little out of the printing range of the sheet, the image data is divided into two sheets to be printed, and then, the approximately whole of the table is printed on the first sheet and only the right frame of the table is printed on the second sheet. In most cases, outputting such a print material is against the intention of the user, therefore, sheets are wasted. For example, when the page of the image data exceeds the size of the sheet, there are a case where the user desires that the image data is printed separately on two sheets and a case where the user desires that the image data is printed after being reduced so as to be fit on one sheet.

SUMMARY

An image forming apparatus of the present disclosure comprises an image processing part, an image forming part, and an inquiry output part. The image processing part performs image processing on image data. The image forming part forms an image on a sheet based on the image data. The inquiry output part outputs, when a page indicated by the image data includes an image at only an upstream side end part in a scanning direction and a consumption of a toner used on the page is less than a predetermined threshold, an inquiry about whether or not a print processing of the page is performed.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
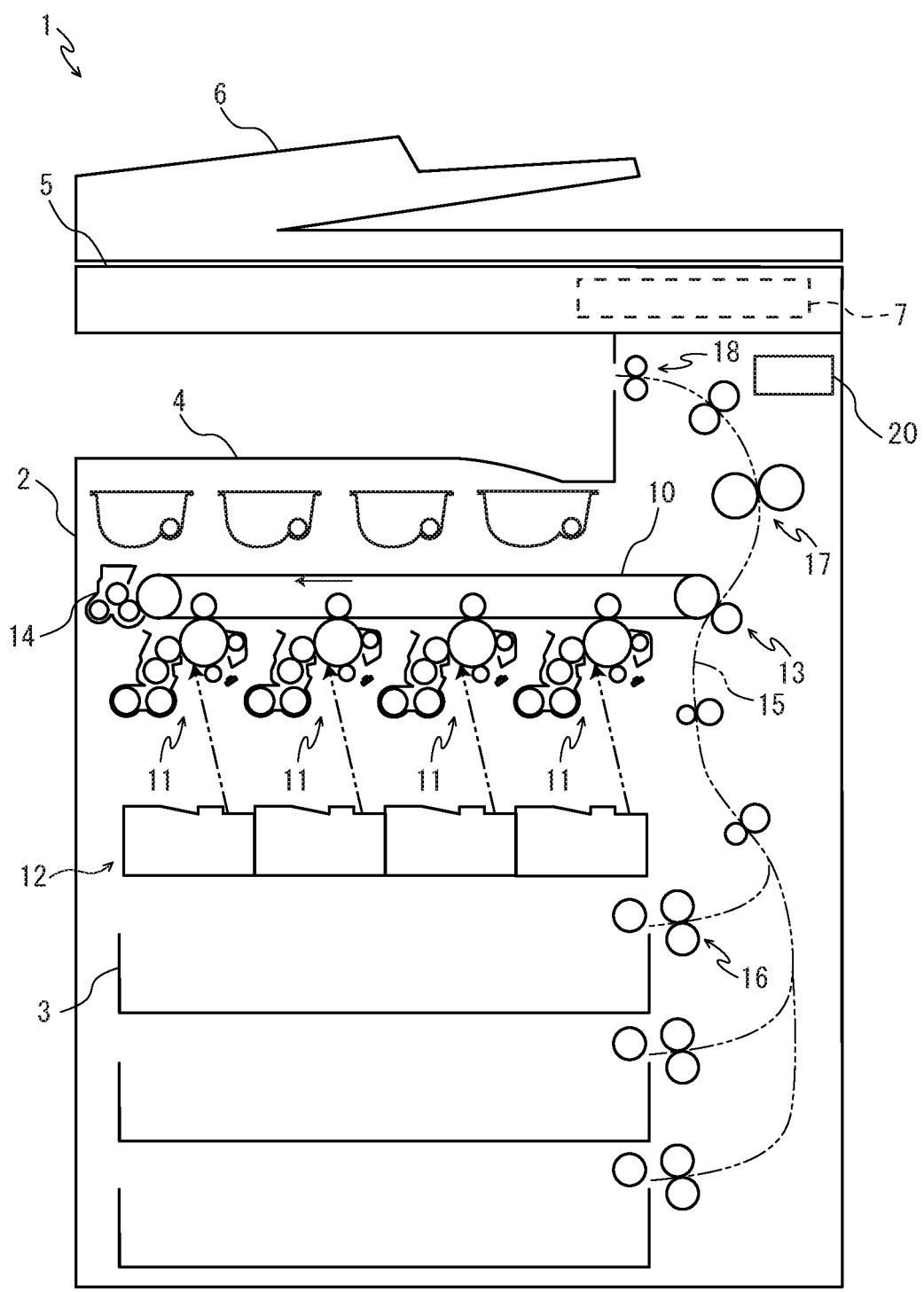
FIG. 1 is a sectional view schematically showing a multifunction peripheral according to an embodiment of the present disclosure.

First, entire structure of a multifunction peripheral 1 (an image forming apparatus) according to an embodiment of the present disclosure will be described with reference to FIG. 1. Hereinafter, for convenience of description, it will be described so that the front side of the multifunction peripheral 1 is positioned at the near side on a paper sheet of FIG. 1. Arrows L, R, U and Lo in each FIG. respectively indicate a left side, a right side, an upper side and a lower side of the multifunction peripheral 1.

The multifunction peripheral 1 includes a roughly box-formed apparatus body 2. In a lower part of the apparatus body 2, a plurality of sheet feeding cartridges 3 storing sheets are provided. In an in-body space of an upper part of the apparatus body 2, an ejected sheet tray 4 is provided.

In the upper part of the apparatus body 2, an image reading part 5 reading things displayed on a document as image data is provided. In a top face of the image reading part 5, a document table composed of a platen glass is provided. The image reading part 5 is configured so as to read an image of the document placed on the platen glass by a scanner and to create image data. Above the image reading part 5, a document conveying part 6 such as an ADF (auto document feeder) feeding the document to the image reading part 5 is provided. The document conveying part 6 is openably/closably attached as a cover member covering the platen glass of the image reading part 5.

Further, in the upper part of the apparatus body 2, an operation display part 7 (a display part) is attached at a front side. The operation display part 7 includes, for example, operation keys, such as a ten key, a start key, a system menu key, a transmission key, a copy key and a confirmation key, and a display device, such as a touch panel, to receive operation input from an operating user.

In a central part of the apparatus body 2, an intermediate transferring belt 10 of an image carrier is windingly stretched among a plurality of conveying rollers. At a lower side of the intermediate transferring belt 10, four image forming parts 11 forming the image are provided for respective toner colors (for example, four colors of yellow, magenta, cyan and black). At a lower side of the four image forming parts 11, an exposure device 12 configured by an LSU (Laser Scanning Unit) is provided. At a right end of the intermediate transferring belt 10, a secondary transferring part 13 is provided and, at a left end of the intermediate transferring belt 10, a cleaning unit 14 for cleaning the intermediate transferring belt 10 is provided. The secondary transferring part 13 is composed of a part at a right end side of the intermediate transferring belt 10 and a secondary transferring roller.

In each image forming part 11, a rotatably photosensitive drum of the image carrier is provided. At the periphery of the photosensitive drum, a charging part, a developing part, a primary transferring part, a static eliminating part, and a cleaning device are disposed in a sequential order of electrophotographic process. At an upper side of developing parts of the image forming parts 11, toner containers corresponding to respective image forming parts 11 are provided for the respective toner colors (for example, four colors of yellow, magenta, cyan and black). Each toner container contains the toner of each color.

At a right side part in the apparatus body 2, a conveying path 15 of the sheet is provided. At an upstream part of the conveying path 15, a sheet feeding part 16 is provided corresponding to the sheet feeding cartridges 3. At a middle stream part of the conveying path 15, the above-described secondary transferring part 13 is provided. At a downstream part of the conveying path 15, a fixing device 17 is provided and, at a downstream end of the conveying path 15, a sheet ejecting part 18 is provided nearby the elected sheet tray 4.

Next, an image forming operation of the multifunction peripheral 1 will be described. In the multifunction peripheral 1, image data is inputted from an external device 28 (refer to FIG. 2) such as a computer connected to a communicating part 23 (refer to FIG. 2), the image reading part 5 or the like and a printing start is instructed, and then an image forming operation is started. In the image forming operation, an image processing according to a predetermined printing setting is performed for the image data. In each image forming part 11, the photosensitive drum is electrically charged by the charging part, and then, exposed on the basis of the image data performed the image processing by the exposure device 12, and thereby, an electrostatic latent image is formed on the photosensitive drum. The electrostatic latent image on the photosensitive drum is developed for a toner image of each color by the developing part. The toner image on the photosensitive drum is primarily transferred to a surface of the intermediate transferring belt 10 by the primary transferring part. The four image forming parts 7 sequentially carry out the above-described operation, and thereby, a toner image of full color (a color toner image) is formed on the intermediate transferring belt 10. The color toner image is supplied to a secondary transferring part 13 at a predetermined secondary transfer timing by rotation of the intermediate transferring belt 10.

On the other hand, a sheet stored in the sheet feeding cartridge 3 is picked up by the sheet feeding part 16, and then, conveyed on the conveying path 15. Subsequently, the sheet on the conveying path 15 is conveyed to the secondary transferring part 13 at the predetermined secondary transfer timing described above. In the secondary transferring part 13, the color toner image on the intermediate transferring belt 10 is secondarily transferred to the sheet. The sheet having the secondarily transferred color toner image is conveyed to a downstream side on the conveying path 15 and, after the color toner image is fixed to the sheet by the fixing part 17, the sheet is ejected from the sheet ejecting part 18 to the ejected sheet tray 4.

Figure 2:
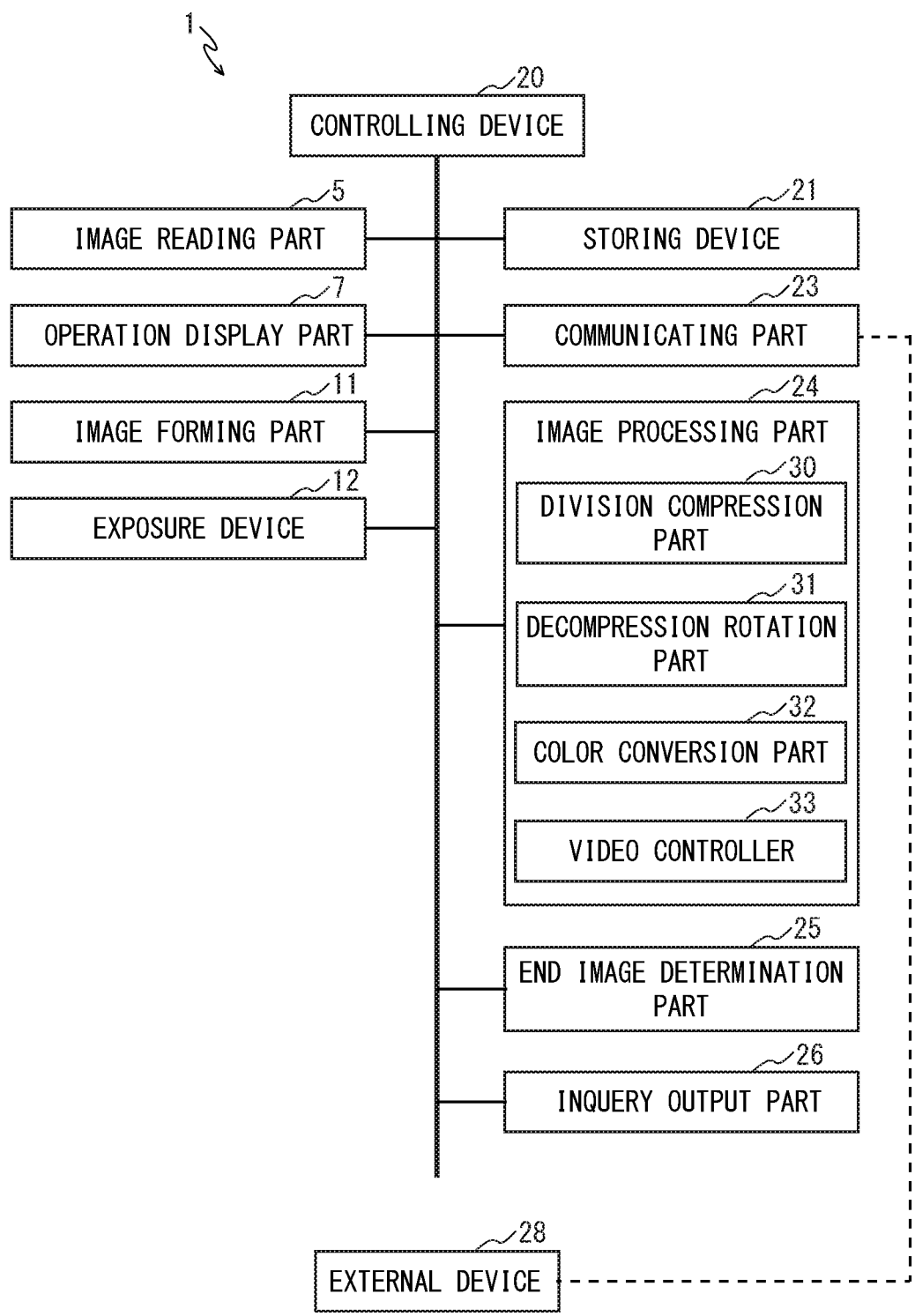
FIG. 2 is a block diagram showing electric structure of the multifunction peripheral according to the embodiment of the present disclosure.

Next, electric structure of the above-described multifunction peripheral 1 will be described with reference to FIG. 2. The multifunction peripheral 1 includes a controlling device 20 which integrally controls each part of the multifunction peripheral 1, inside the apparatus body 2. The controlling device 20 is configured by CPU and others, and connected to a storing device 21 such as ROM and RAM.

The controlling device 20 controls each component connected to the controlling device 20 on the basis of control programs and control data stored in the storing device 21. For example, the controlling device 20 is connected to each part of the multifunction peripheral 1, such as the image reading part 5, the operation display part 7, each image forming part 11, the exposure device 12. The controlling device 20 is connected to the communicating part 23, an image processing part 24, an end image determination part 25, an inquiry output part 26 and others. In addition, the image processing part 24 may be configured by ASIC, FPGA or the like, and the end image determination part 25 and the inquiry output part 26 may be configured by programs which is stored in the storing device 21 and is performed by the controlling device 20.

The communicating part 23 is an interface which is communicably connected to the external device 28 via a network such as LAN. The control device 20 inputs image data from the external device 28 via the communicating part 23, performs the image processing on the image data by the image processing part 24, and then, outputs the image data to the exposure device 12. In addition, the control device 20 may input image data from an image reading device, and may input image data from an external memory such as a USB memory.

The image processing part 24 includes a division compression part 30, a decompression rotation part 31, a color conversion part 32 and a video controller 33. The image processing part 24 performs the image processing on image data stored in the storing device 21.

The division compression part 30 divides each page of the input image data into predetermined blocks, and then, compresses the image data for every block and stores the compressed image data in the storing device 21. Here, the page is a page which is set, in an original image data or a page which is set by making the image data correspond to an initial print setting. For example, the division compression part 30 divides each page of the image data into a predetermined number of bands in a sub scanning direction and divides each band into a predetermined block number of sub bands in a main scanning direction. The sub bands are configured by a predetermined number (for example, 128*128) of pixel data. In addition, the numbers of the bands, the sub bands and the pixel data are set so as to be divisible by a sheet size.

A header information is given to each sub band. The header information includes, for example, a compression size of the sub band. In addition, the header information includes a blank register which indicates whether or not the sub band is blank (no image), that is, whether or not all pixel data included in the sub bands are blank. The blank register indicates the sub band is blank when the blank register is 1, and indicates the sub band is not blank when the blank register is 0.

Moreover, the header information includes a center register indicates whether or not the sub band is allocated inside the page, that is, whether or not the sub band is allocated other than the farthest edge part (the farthest left edge, the farthest right edge, the farthest upper edge, the farthest lower edge). The center register indicates the sub band is allocated inside the page when the center register is 1, and the blank register indicates the sub band is allocated at one of the farthest edge parts when the center register is 0.

The decompression rotation part 31 reads the image data stored in the storing device 21 to decompress each sub band. The decompression rotation part 31 performs a rotation processing and a allocate changing of each sub band so that the decompressed data is allocated on the page after the print settings such as a direction of printing and an intensive printing (for example, the page after such the print settings by a user). The decompression rotation part 31 may rewrite the header information of each sub band according to the rotation processing and the allocate changing of each sub band. Thus, the decompression rotation part 31 generates image data including each band corresponding to the page after the print setting, and stores the image data in the storing device 21.

The color conversion part 32 reads the image data after the processing by the decompression rotation part 31 from the storing device 21, and coverts each pixel data to pixel data of CMYK which is obtained by adding black to three primary colors when each sub band of the image data includes pixel data of RGB which is three primary colors. In addition, it is possible to calculate an amount of each toner (each toner consumption) of CMYK needed to form an image of each sub band based on the pixel data of CMYK of each sub band. Therefore, it is possible to calculate each toner consumption of CMYK in the image data based on each toner consumption of each sub band.

The color conversion part 32 performs a halftone processing on the image data of CMYK to generate halftone image data. Then, the color conversion part 32 stores the image date after the halftone processing as an image processed image data in the storing device 21.

The video controller 33 reads the image processed image data from the storing device 21, controls each part so that the printing (image forming operation) is performed based on the image data, and outputs the image data to the exposure device 12 in order to, for example, perform the print processing on the image data for every page.

Figure 3:
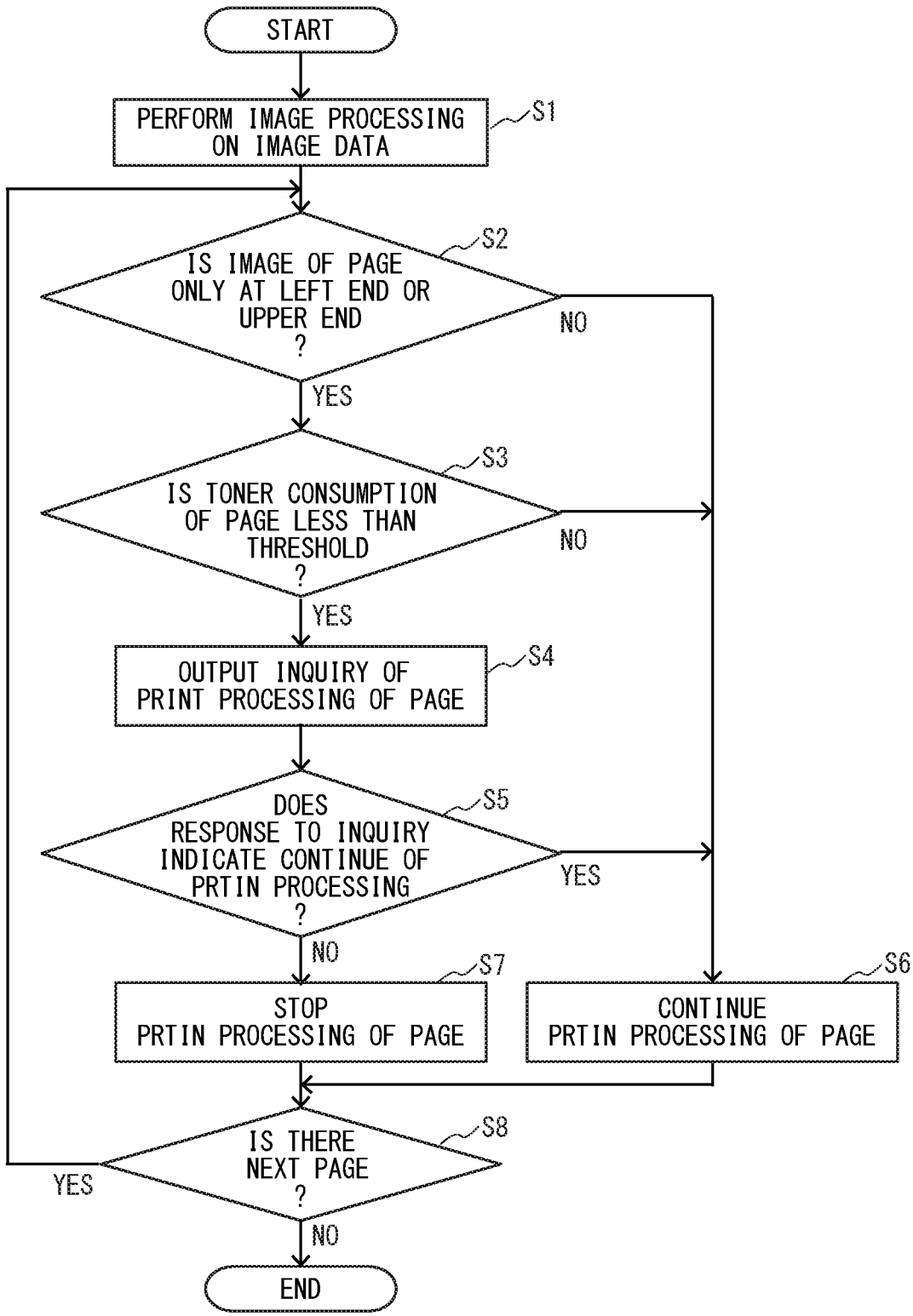
FIG. 3 is a flow chart showing an operation of determination and inquiry of an end image of a page in the multifunction peripheral according the embodiment of the present disclosure.

The end image determination part 25 performs the image processing on the image data by the image processing part 24 (step S1 in FIG. 3). Then, The end image determination part 25 determines, before the print processing is performed on each page, whether or not each page includes an image only at the left end or the upper end, that is, the end part of the upstream side in a scanning direction (the main scanning direction or the sub scanning direction) and whether or not the image is an end image the toner consumption of which is low.

First, the end image determination part 25 reads the image data after the processing by the decompression rotation part 31 from the storing device 21. Then, the end image determination part 25 identifies the sub band of the left end or the upper end and other sub bunds based on array of each sub band configuring each page of the image data and the center register of the header information. Then, the end image determination part 25 determines whether each page includes an image only in the sub bund of the left end or the upper end based on the blank register of the header information of each sub band. In addition, the sub bund of the left end or the upper end may be the sub bund of the farthest left end or the farthest upper end, or may be the sub bund configuring a predetermined number (for example, two or three) of rows or columns from the farthest left end or the farthest upper end.

For example, when the blank register of any sub band of the left end (or upper end) indicates no blank and the blank register of sub bands other than the left end (or upper end) indicates blank, it is determined that only the sub band of the left end (or upper end) includes an image.

Thus, the end image determination part 25 determines whether or not each page includes an image at only the left end or the upper end (step S2 in FIG. 3). In addition, when a page includes an image at other than the left end and the upper end (step S2: NO in FIG. 3), the printing processing of the page is continued (step S6 in FIG. 3).

Furthermore, when a page includes an image at only the left end or the upper end (step S2: YES in FIG. 3), the end image determination part 25 determines whether or not the toner consumption is low with respect to the page (step S3 in FIG. 3).

First, the end image determination part 25 reads the image data after the processing by the color conversion part 32 from the storing device 21. Moreover, the end image determination part 25 calculates each toner consumption of CMYK as described above, with respect to a page including an image at only the left end or the upper end in the image data. Then, the end image determination part 25 determines whether or not the toner consumption of the page is less than a predetermined threshold.

Concretely, the end image determination part 25 calculates each toner consumption of CMYK of each page in the image data. Thus, the end image determination part 25 compares the toner consumption of the current page including an image at only the left end or the upper end and the toner consumption of the previous page, and sets a threshold of a relative value (a ration of the toner consumption of the current page to the toner consumption of the previous page) of the toner consumption of both pages. Then, when the relative value is less than the threshold, the end image determination part 25 determines that the toner consumption of the current page is low.

Alternatively, the end image determination part 25 sets a threshold of the toner consumption of a page, and determines, when the toner consumption of the page including an image at only the left end or the upper end in the image data is less than the threshold, the toner consumption of the page is low.

Then, the end image determination part 25 determines that the page the toner consumption of which is determined to be low is an end image. In addition, when the toner consumption of the page is determined to be low (step S3: NO in FIG. 3), the printing processing of the page is continued (step S6 in FIG. 3).

When the end image determination part 25 determines that the page is an end image (step S3: NO in FIG. 3), the inquiry output part 26 outputs, before the print processing is performed on the page of the end image, an inquiry of the end image print whether or not the print processing is performed on the page of the end image to a user (step S4 in FIG. 3). In addition, the inquiry output part 26 may instruct stop of the print processing to the control device 20 when the inquiry output part 26 performed the inquiry of the end image print.

For example, the inquiry output part 26 displays an inquiry screen indicating the inquiry of the end image print on the operation display part 7. Alternatively, the inquiry output part 26 sends the inquiry of the end image print to the external device 28 such as a computer of a user via the communicating part 23, and makes the external device 28 display the inquiry screen indicating the inquiry.

Moreover, the inquiry output part 26 inputs, from the operation display part 7 or the external device 28, a response of the end image print by operation to the operation display part 7 or the inquiry screen of the external device 28. When the response of the end image print indicates continue of the print processing of the page of the end image (step S5: YES in FIG. 3, the inquiry output part 26 indicates the control device 20 to continue the print processing of the page of the end image. On the other hand, when the response of the end image print indicates stop of the print processing of the page of the end image (step S8: NO in FIG. 3), the inquiry output part 26 stop the print processing of the page of the end image (step S7 in FIG. 3).

Then, when the image page includes the next page (step S8: YES in FIG. 3), the control device 20 returns to step S2 in FIG. 3 to repeat the processing described above by the end image determination part 25 and the inquiry output part 26. On the other hand, when the image page does not include the next page (step S8: NO in FIG. 3), the control device 20 stops the image forming operation.

In accordance with the embodiment, as described above, the multifunction peripheral 1 (the image forming apparatus)

includes the image processing part 24 performing image processing on the image data, the image forming part 11 forming an image on a sheet based on the image data, the inquiry output part 26 outputting, when a page indicated by the image data includes an image at only the left end or the upper end (at only the upstream side end part in the scanning direction) and the toner consumption of the page (the consumption of the toner used on the page) is less than the predetermined threshold, the inquiry about whether or not the print processing of the page is performed.

Thereby, when the printing range of the page set in the image data exceeds the size of the sheet and the page is divided into a page including an image (for example, a table, a figure, a picture or the like) the right end or the lower end of which is missing and a page including a remaining image of only the right end or the lower end at the left end or the upper end, print processing for an image of the right end or the lower end part can be matched to the intention of the user by the inquiry. Therefore, it is possible to suppress output of a print material which is against the intention of the user.

In addition, in another embodiment, even though it is determined that a page indicated by the image data includes an image at only the left end or the upper end, when the image is recognized as a character by the control device 20 and others, the multifunction peripheral 1 may continue the print processing without the output of the inquiry by the inquiry output part 26. Therefore, a page including few characters such as a text with only one line can be printed as usual.

In addition, in another embodiment, the multifunction peripheral 1 may be configured so as to refer to a file format of the image data by the control device 20 and others. Moreover, the multifunction peripheral 1 may be configured so as to perform the determination of the end image and the inquiry of the end image printing by the end image determination part 25 and the inquiry output part 26 when the file format is a file format peculiar to a table, a figure or a picture, and so as not to perform the determination of the end image and the inquiry of the end image printing by the end image determination part 25 and the inquiry output part 26 when the file format of the image data is a file format peculiar to a document.

In addition, the multifunction peripheral 1 further includes the operation display part 7 (the display part), and the inquiry output part 26 displays the inquiry on the operation display part 7. Therefore, the user can suppress output of a print material which is against the intention of the user.

Alternatively, the multifunction peripheral 1 further includes a communicating part inputting the image data from the external device 28, and the inquiry output part 26 sends the inquiry to the external device 28 via the communicating part 23. Therefore, the user can suppress output of a print material which is against the intention of the user by operating the external device 28 such as himself or herself computer away from the multifunction peripheral 1.

In addition, the multifunction peripheral 1 determines whether or not the page includes an image at only the sub band of the left end or the upper end by determining, in the image processing (the processing by the decompression rotation part 31) for the sub bands which is generated by dividing the page, whether or not there is an image for every sub band. Therefore, it is possible to certainly determine whether or not there is an image of the left end or the upper end of the page by a brief manner.

Moreover, the multifunction peripheral 1 obtains the consumption of the toner based on the pixel data used in a color conversion of the image data by the image processing part 24 (the color conversion part 32). Therefore, it is possible to certainly obtain the consumption of toner by a brief manner.

In addition, in the multifunction peripheral 1, the threshold used in the determination of the consumption of toner is set by the relative value of the consumption of the toner of the current page to the previous page. Therefore, it is possible to determine the consumption of the toner according to an individuality of each image data.

Although the above-described embodiments have described about a case applying the configuration of the present disclosure to the multifunction peripheral 1, in a further different embodiment, the configuration of the present disclosure may be applied to another image forming apparatus, such as a monochrome printer, a color printer, a copying machine and a facsimile.

The above-description of the embodiment of the present disclosure was described about a preferable embodiment of the image forming apparatus according to the disclosure. However, the technical scope of the present disclosure is not limited to the embodiments.

The invention claimed is:

1. An image forming apparatus comprising:
   an image processing part performing image processing on image data;
   an image forming part forming an image on a sheet based on the image data; and
   an inquiry output part outputting, when a page indicated by the image data includes an image at only an upstream side end part in a scanning direction and a consumption of a toner used on the page is less than a predetermined threshold, an inquiry about whether or not a print processing of the page is performed,
   wherein whether or not the page includes an image at only the upstream side end part in the scanning direction is determined by determining, in an image processing for sub bands which is generated by dividing the page, whether or not there is an image for every sub band.

2. The image forming apparatus according to claim 1 further comprising a display part,
   wherein the inquiry output part displays the inquiry on the display part.

3. The image forming apparatus according to claim 1 further comprising:
   a communicating part inputting the image data from an external device,
   wherein the inquiry output part sends the inquiry to the external device via the communicating part.

4. The image forming apparatus according to claim 1, wherein
   the consumption of the toner is obtained based on pixel data used in a color conversion of the image data by the image processing part.

5. The image forming apparatus according to claim 1, wherein
   the threshold is set by a relative value of the consumption of the toner of a current page to a previous page.

6. The image forming apparatus according to claim 1, wherein
   the inquiry output part does not output the inquiry when the image is recognized as a character, even though the page includes an image at only the upstream side end part in the scanning direction.

7. The image forming apparatus according to claim 1, wherein the inquiry output part performs the determination of the image and the inquiry when a file format of the image data is a file format peculiar to a table, a figure or a picture, and does not perform the determination of the image and the inquiry when the file format of the image data is a file format peculiar to a document.

8. An image forming apparatus comprising:

an image processing part performing image processing on image data;

an image forming part forming an image on a sheet based on the image data; and an inquiry output part outputting, when a page indicated by the image data includes an image at only an upstream side end part in a scanning direction and a consumption of a toner used on the page is less than a predetermined threshold, an inquiry about whether or not a print processing of the page is performed, wherein the inquiry output part does not output the inquiry when the image is recognized as a character, even though the page includes an image at only the upstream side end part in the scanning direction.

9. An image forming apparatus comprising:

an image processing part performing image processing on image data;

an image forming part forming an image on a sheet based on the image data; and an inquiry output part outputting, when a page indicated by the image data includes an image at only an upstream side end part in a scanning direction and a consumption of a toner used on the page is less than a predetermined threshold, an inquiry about whether or not a print processing of the page is performed, wherein the inquiry output part performs the determination of the image and the inquiry when a file format of the image data is a file format peculiar to a table, a figure or a picture, and does not perform the determination of the image and the inquiry when the file format of the image data is a file format peculiar to a document.

* * * * *